(12) United States Patent
Chen et al.

(10) Patent No.: US 7,894,819 B2
(45) Date of Patent: Feb. 22, 2011

(54) METHOD AND SYSTEM OF ALLOCATING CODE RESOURCES FOR HIGH SPEED PHYSICAL DOWNLINK SHARED CHANNEL

(75) Inventors: Xiaoyan Chen, Guangdong (CN); Chaowei Xie, Guangdong (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 503 days.

(21) Appl. No.: 11/589,423

(22) Filed: Oct. 30, 2006

(65) Prior Publication Data

US 2007/0104153 A1  May 10, 2007

(30) Foreign Application Priority Data

Oct. 31, 2005 (CN) .................. 2005 1 0117077

(51) Int. Cl.
*H04W 72/00* (2009.01)
(52) U.S. Cl. .................. 455/450; 455/452.1; 370/236; 370/328; 370/329; 370/412; 370/442; 375/141; 348/419.1; 714/746
(58) Field of Classification Search .................. 370/341, 370/342, 335, 236, 328, 329, 412, 442, 469, 370/529; 455/450, 452.2, 452.1; 375/141; 348/419.1; 714/141
See application file for complete search history.

(56) References Cited

U.S. PATENT DOCUMENTS

| | | | | |
|---|---|---|---|---|
| 6,757,319 | B1 * | 6/2004 | Parsa et al. ................. | 375/141 |
| 7,027,420 | B2 * | 4/2006 | Hamalainen ................. | 370/335 |
| 7,317,700 | B2 * | 1/2008 | Hwang ........................ | 370/328 |
| 2004/0085989 | A1 * | 5/2004 | Boumendil et al. ......... | 370/442 |
| 2004/0152473 | A1 * | 8/2004 | Kuwano et al. ........... | 455/456.2 |
| 2004/0160923 | A1 * | 8/2004 | Nobukiyo et al. ........... | 370/335 |
| 2004/0248520 | A1 * | 12/2004 | Miyoshi ................... | 455/67.13 |

(Continued)

FOREIGN PATENT DOCUMENTS

EP  1448012  8/2004

(Continued)

OTHER PUBLICATIONS

"3rd Generation Partnership Project"; 3GPP TR 25.858 V1.0.0, XX, XX Dec. 2001, pp. 1,3-23.

*Primary Examiner*—William D Cumming
(74) *Attorney, Agent, or Firm*—Finnegan, Henderson, Farabow, Garrett & Dunner LLP

(57) ABSTRACT

A method and system of allocating code resources for a high speed physical downlink shared channel are disclosed. The method includes: recording usage states for all code resources of a system at a base station; allocating, by the base station, code resources with idle state to the HS-PDSCH when the code resources of the HS-PDSCH are not enough. The system includes a radio network controller and a base station; the radio network controller is configured to allocate code resources of a system to corresponding channels, and inform the usage states of the code resources to the base station. When there is a shortage of code resources for HS-PDSCHs, idle code resources in a same code tree may be temporarily allocated to the HS-PDSCHs. Thus, the shortage of code resources is moderated to some extent, and the efficiency of code resources in the overall system is raised.

11 Claims, 1 Drawing Sheet

U.S. PATENT DOCUMENTS

| | | | |
|---|---|---|---|
| 2005/0068973 A1* | 3/2005 | Taffin et al. | 370/412 |
| 2005/0075124 A1* | 4/2005 | Willenegger et al. | 455/522 |
| 2005/0157676 A1* | 7/2005 | Kwak et al. | 370/328 |
| 2005/0176435 A1* | 8/2005 | Fauconnier et al. | 455/450 |
| 2006/0067364 A1* | 3/2006 | Jung et al. | 370/469 |
| 2006/0171342 A1* | 8/2006 | Dateki | 370/311 |
| 2006/0179387 A1* | 8/2006 | Taffin et al. | 714/746 |
| 2006/0189272 A1* | 8/2006 | Willenegger et al. | 455/3.01 |
| 2006/0240858 A1* | 10/2006 | Yamazaki et al. | 455/522 |
| 2007/0008933 A1* | 1/2007 | Braun et al. | 370/335 |
| 2007/0091810 A1* | 4/2007 | Kim et al. | 370/236 |
| 2007/0097257 A1* | 5/2007 | El-Maleh et al. | 348/419.1 |
| 2007/0097918 A1* | 5/2007 | Cai et al. | 370/331 |
| 2007/0133620 A1* | 6/2007 | Kim | 370/529 |
| 2007/0211670 A1* | 9/2007 | Andersson | 370/335 |
| 2008/0130610 A1* | 6/2008 | Karlsson | 370/342 |
| 2008/0153505 A1* | 6/2008 | Lindheimer et al. | 455/452.1 |
| 2009/0034455 A1* | 2/2009 | Lee et al. | 370/329 |

FOREIGN PATENT DOCUMENTS

| | | | |
|---|---|---|---|
| JP | 2008-530898 | 8/2008 | |
| WO | WO03/095671 | 11/2003 | |
| WO | WO 03/096571 A1 * | 11/2003 | 455/522 |
| WO | WO03/107707 | 12/2003 | |
| WO | 2006085800 A1 | 8/2006 | |
| WO | WO2006/085800 | 8/2006 | |

* cited by examiner

METHOD AND SYSTEM OF ALLOCATING CODE RESOURCES FOR HIGH SPEED PHYSICAL DOWNLINK SHARED CHANNEL

FIELD OF THE INVENTION

The present invention relates to code resource allocation techniques in a communication system, and more particularly, to a method and system of allocating code resources for a High Speed Physical Downlink Shared Channel (HS-PDSCH).

BACKGROUND OF THE INVENTION

High Speed Downlink Packet Access (HSDPA) is a key technology in the Wideband Code Division Multiple Access (WCDMA) system, which can realize downlink high speed data transmission through a series of approaches, such as Adaptive Modulation and Coding (AMC), Hybrid Automatic Repeat Request (HARQ), NodeB fast scheduling and so on.

Two kinds of downlink channels are added into the WCDMA system where the HSDPA has been introduced, one is a High Speed Physical Downlink Shared Channel (HS-PDSCH) for transmitting data information, and the other is a High Speed Shared Control Channel (HS-SCCH) for transmitting control information of the HS-PDSCH. When there is no HS-PDSCH, C(256,1) is fixedly allocated to a Primary Common Control Physical Channel (PCCPCH) and C(256,0) to a Primary Common Pilot Channel (PCPICH) by a Radio Network Controller (RNC), where C(X,Y) represents a channelization code with a Spreading Factor (SF) equal to X and a code number equal to Y, and the channelization code is commonly called a code. Apart from the above two channels, other channels in the WCDMA system obtain their channelization codes by means of dynamic allocation due to the limitation of downlink code resources. After the HS-PDSCH is introduced into the WCDMA system, a cell may simultaneously have multiple HS-PDSCHs, and it is required in the WCDMA system that the channelization codes of these multiple HS-PDSCHs may be consecutive. Therefore, the RNC may generally reserve some code resources for the HS-PDSCHs. As specified in the protocols, the SFs of the channelization codes used by the HS-PDSCHs are 16, and thus, the RNC will reserve several consecutive channelization codes with the SF 16 for the HS-PDSCHs, which may not be allocated to other channels any more. According to the specifications, the maximum number of HS-PDSCHs available in each cell is 15, and these HS-PDSCHs are shared by HSDPA users in the cell.

When allocating code resources for HS-PDSCHs, various strategies can be employed by the RNC. For example, the RNC may reserve zero code resource according to practical situations, that is, reserve no code resource; or reserve code resources according to the required highest speed of a single traffic; or according to the capacity of a traffic model. Generally, the RNC determines the code resources needed by the HS-PDSCHs according to the traffic model of each cell. When traffic models and strategies for accessing bearers of a cell have been determined, the code resources reserved by the RNC for the HS-PDSCHs can primarily meet the real application demands of cell users.

However, traffic capacity of HS-PDSCHs may change with the actual demands of users. Moreover, the environment of channels may also change with the moving of users or changing of surroundings, which may lead to the changing of code resource demands of cell users. If the amount of code resources reserved for HS-PDSCHs by the RNC is small, and no appropriate adjustment is carried out according to actual demands, code resources with idle state in the system can not be used by the HS-PDSCHs, and there may be a shortage of code resources for the HS-PDSCHs, which will reduce the efficiency of code resources.

SUMMARY OF THE INVENTION

An embodiment of the present invention is to provide a method to allocate the idle code resources of a cell to the HS-PDSCHs at the base station according to the actual usage of code resources, so as to maximally meet the demands of HS-PDSCHs.

Another method is provided in an embodiment of the present invention to meet the code resource demands of HS-PDSCHs and raise the efficiency of code resources.

Further, a system of allocating code resources for an HS-PDSCH is provided in an embodiment of the present invention to overcome the shortage of code resources for the HS-PDSCHs, and meet the code resource demands of HS-PDSCHs.

The method of allocating code resources for a high speed physical downlink shared channel, HS-PDSCH, in a system comprising a radio network controller and a base station, the method including:

recording, and updating usage states of code resources at the base station, wherein the base station determines the usage states of the code resources according to messages from the radio network controller, and when the base station receives a message from the radio network controller indicating that a code in the code resources having same spreading factors as channelization codes of the HS-PDSCH is allocated, the base station marks the usage state of the code as occupied; and allocating at the base station code with idle state to the HS-PDSCH when the code resources of the HS-PDSCH are not enough.

The system of allocating code resources for a HS-PDSCH, the system includes a radio network controller and a base station;

wherein the radio network controller is configured to allocate code resources of a system to corresponding channels, and inform the usage states of the code resources to the base station;

the base station is configured to record and update the usage states of the code resources at the base station according to the information sent from the radio network controller, mark the usage state of code in the code resources as occupied when the code having same spreading factors as channelization codes of the HS-PDSCH allocated and allocate code resources with idle state to the HS-PDSCH when the code resources of the HS-PDSCH are not enough.

It can be seen from the foregoing technical schemes that, through the method of allocating code resources to a High Speed Physical Downlink Shared Channel (HS-PDSCH) of the embodiments, a virtual code information table may be set at a base station, that is a NodeB or "NODEB," to monitor usage states of all codes of which the SFs are the same as those of the codes of the HS-PDSCHs in a cell. When the code resources of the HS-PDSCHs are limited while other codes with the same SF are idle, the NODEB may, based on short-time scheduling characteristics of the HS-PDSCHs, allocate the idle code resources to the HS-PDSCHs for temporary use and release the temporarily used idle code resources after the scheduling is finished. Thus, the problem that the code resources of the HS-PDSCHs are limited is moderated, and the efficiency of the code resources of the whole system is raised.

Moreover, a system of allocating code resources for the HS-PDSCH is provided in the embodiments, which is managed by both RNC and NODEB. The RNC is responsible for allocating code resources for all channels in the system, while the NODEB is responsible for temporarily allocating code resources with idle state to HS-PDSCHs and releasing the temporarily used code resources back to idle state. At present, the NODEB is adopted to dynamically manage the code resources of HS-PDSCHs, which simplifies the RNC's policies of allocating code resources for HS-PDSCHs. Further, the code resources of HS-PDSCHs may be completely managed at the NODEB. In this way, the RNC may allocate a small number of code resources for the HS-PDSCHs, or even allocate no code resource for the HS-PDSCHs.

DETAILED DESCRIPTION OF THE INVENTION

The present invention is hereinafter further described in detail with reference to the accompanying drawing as well as embodiments so as to make the objects, technical schemes and merits thereof clearer.

As specified in protocols, all codes reserved for HS-PDSCHs have a same Spreading Factor 16. When the RNC allocates code resources to all channels in the system, some rules should be followed. For example, with respect to the DCH, the RNC starts from the smallest code number in the code tree, and with respect to the HS-PDSCHs, from the largest one. Thus, on one hand, fragments of codes brought about by code resource allocation will be reduced to a maximum limit; on the other hand, codes with smaller SFs in the code tree will be most possibly set aside for high speed traffic, which may raise the efficiency of codes.

Figure 1:
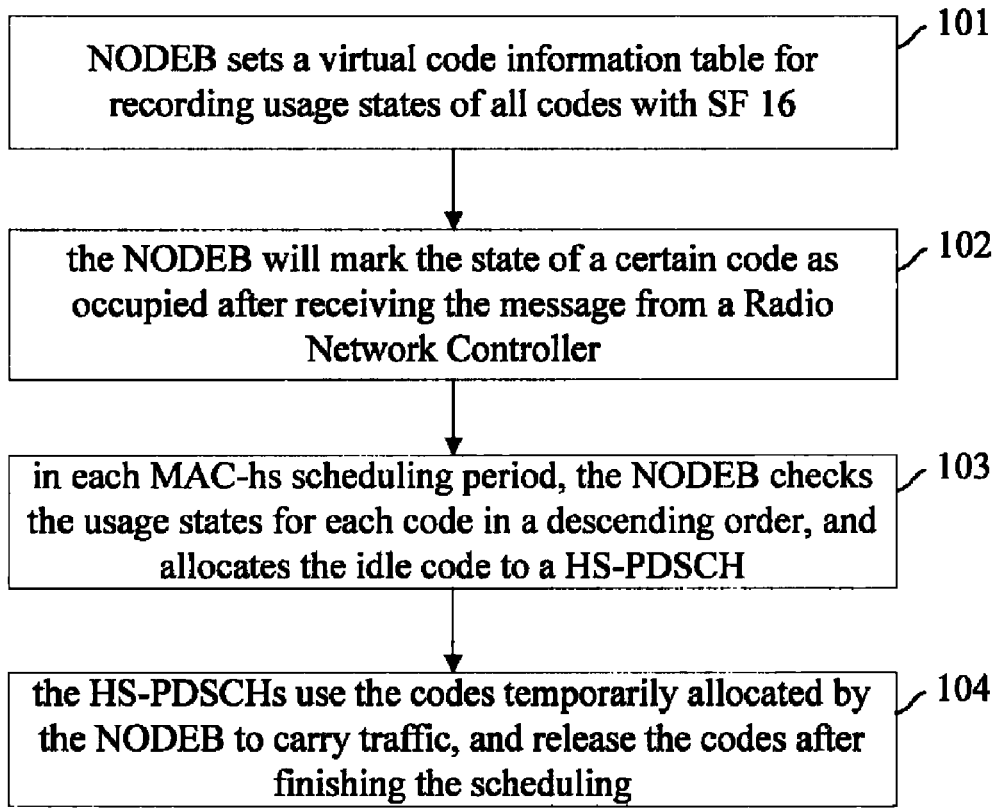
FIG. 1 is a flowchart of allocating code resources for HS-PDSCHs in an embodiment of the present invention.
Figure 2:
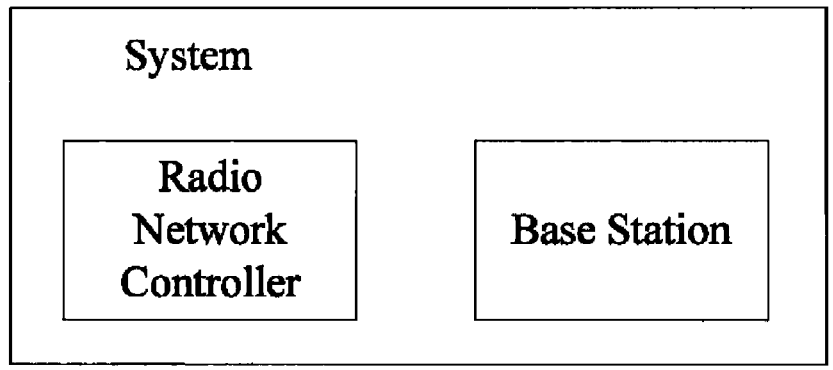
FIG. 2 is a schematic diagram illustrating the structure of a system of allocating code resources for a HS-PDSCH channel in an embodiment of the present invention.

According to the strategies mentioned above, FIG. 1 shows a flowchart of allocating code resources for HS-PDSCHs in an embodiment of the present invention. FIG. 2 illustrates a system including a radio network controller and base station in which the allocating of code resources may be practiced. With reference to the flowchart, the allocating includes the steps of:

Step 101: An NODEB sets a virtual code information table for HS-PDSCHs, for recording usage states of all codes having a same SF with the channelization codes of the HS-PDSCHs.

Here, the code having a same SF with the channelization codes of the HS-PDSCHs refers to a code with the SF 16. As C(256,0) and C(256,1), which are subcodes of C(16,0), have been fixedly allocated to common channels by the RNC, C(16,0) can not be temporarily used by the HS-PDSCHs. Thus, the virtual code information table may only record the usage states of the other fifteen codes C(16,1), C(16,2), . . . , C(16,15). Initially, these fifteen codes are marked as idle, showing that the codes have not been used yet.

Step 102: When a certain code or any subcode of a certain code in the virtual code information table is used, a Radio Network Controller (RNC) will send a message to the NODEB, and the NODEB will mark the usage state of the certain code as occupied.

In this step, if the code currently used is a subcode, the NODEB will determine the code with the SF 16 to which the subcode corresponds after receiving the message from the RNC, and mark the usage state of the code as occupied. For example, suppose the subcode currently used is C(32,2), then the NODEB will mark the state of C(16,1) as occupied.

Moreover, if a certain code is released after being used, the RNC may send a message to the NODEB as well. Then, the NODEB may change the usage state of the code from occupied to idle in the virtual code information table.

Step 103: In each Medium Access Control-high speed (MAC-hs) scheduling period, the NODEB will check the usage states for each code of a code tree recorded in the virtual code information table in a descending order. If there is a code with idle state, the NODEB may allocate the code to an HS-PDSCH for temporary use and mark the usage state of the code as temporarily used in the virtual code information table. With respect to the codes marked as occupied, since these codes have been allocated by the RNC, they can not be allocated to the HS-PDSCHs at the NODEB for temporary use.

Step 104: The HS-PDSCHs use the codes temporarily allocated by the NODEB to carry traffic, and release the codes after finishing the scheduling. Afterwards, the usage states of the codes at the NODEB are changed from temporarily used to idle so that they can be used again in a subsequent process.

The state temporarily used means to occupy a code for a short while. Since the scheduling period of an HS-PDSCH is generally 2 ms, a code will be back to an idle state after being used by the HS-PDSCH for 2 ms. Even if a certain code is allocated by the RNC at the same time when it is temporarily used at the NODEB, a conflict for the usage of the code will not happen in this situation, because it will take at least 50 ms for the RNC to send out the message and receive a response from the NODEB, i.e., it will take at least 50 ms for the RNC to allocate the codes. Therefore, it is feasible to temporarily use an idle code in the embodiment.

A specific example will be given hereinafter to describe a method of dynamically managing code resources for HS-PDSCHs at an NODEB. In this example, four codes reserved by the RNC for HS-PDSCHs are C(16,15), C(16,14), C(16,13) and C(16,12), respectively. All of the four codes are used, thus the states of C(16,15), C(16,14), C(16,13) and C(16,12) in the virtual code information table are marked as occupied, and the states of other codes in the table are idle.

In a certain scheduling period, the NODEB determines that the code resources allocated to HS-PDSCHs are not enough according to the actual traffic volume. If no more code resources are allocated to the HS-PDSCHs, data volume sent by users in this scheduling period will be decreased, which will reduce throughput of the system and lead to a waste of system power.

At this moment, the NODEB adopts a scheduling algorithm to figure out the code number needed by users of its cell, and determines that two more codes are needed by the HS-PDSCHs. Then, the NODEB sequentially searches the records of the virtual code information table saved in itself in a descending order. Through searching the virtual code information table, the NODEB finds that two codes consecutive with the codes allocated to the HS-PDSCHs by the RNC, that is C(16,11) and C(16,10), are idle, thus allocates C(16,11) and C(16,10) to the HS-PDSCHs for temporary use in this scheduling period, and marks the usage states of these two codes as temporarily used. Therefore, the problem that there is a shortage of codes for HS-PDSCHs can be solved in these cases.

It can be seen from the foregoing embodiments that, according to the method and system of allocating code resources for HS-PDSCHs in accordance with the present invention, a virtual code information table is set for monitoring the usage states of all the codes in a cell of which the SFs are the same as those of the codes of HS-PDSCHs. When there is a shortage of code resources for HS-PDSCHs, idle code resources in a same code tree may be temporarily allocated to the HS-PDSCHs. Thus, the shortage of code resources for HS-PDSCHs is moderated to some extent, and the efficiency of code resources is raised.

What is claimed is:

1. A method of allocating code resources for a high speed physical downlink shared channel, HS-PDSCH, in a system comprising a radio network controller and a base station, the method comprising:

recording, and updating usage states of code resources at the base station, wherein the base station determines the usage states of the code resources according to messages from the radio network controller, and when the base station receives a message from the radio network controller indicating that a code in the code resources having same spreading factors as channelization codes of the HS-PDSCH is allocated, the base station marks the usage state of the code as occupied, and if a subcode of the code is allocated by the radio network controller, the base station marks the usage state of the code to which the subcode corresponds as occupied; and allocating at the base station code with idle state to the HS-PDSCH when the code resources of the HS-PDSCH are not enough.

2. The method according to claim 1, wherein allocating at the base station code with idle state to the HS-PDSCH comprises:

the base station searching in a virtual code information table recording the usage states of code resources at the base station the state records of the codes one by one in a descending order of a code tree, allocating the idle codes, which are consecutive with the codes allocated to the HS-PDSCH by the radio network controller, to the HS-PDSCH for temporary use, and setting the states of the idle codes as temporarily used in the virtual code information table.

3. The method according to claim 2, further comprising: the HS-PDSCH releasing the codes with temporarily used state after finishing scheduling, and the base station setting the states of the codes as idle.

4. The method according to claim 1, wherein recoding, and updating usage states of code resources comprises:

after allocating a code, the base station receiving information from a radio network controller that the code has been used, and setting the state of the corresponding code as occupied in a virtual code information table recording the usage states of code resources at the base station; or, after releasing an occupied code, the base station receiving information from a radio network controller that the code has been set free, and setting the corresponding code as idle in a virtual code information table recording the usage states of code resources at the base station.

5. The method according to claim 4, wherein allocating code with idle state to the HS-PDSCH comprises: the base station searching in the virtual code information table the state records of the codes one by one in a descending order of a code tree, allocating the idle codes, which are consecutive with the codes allocated to the HS-PDSCH by the radio network controller, to the HS-PDSCH for temporary use, and setting the states of the idle codes as temporarily used in the virtual code information table.

6. The method according to claim 5, further comprising: the HS-PDSCH releasing the codes with temporarily used state after finishing scheduling, and the base station setting the states of the codes as idle.

7. The method according to claim 1, further comprising: the base station determining in each scheduling period whether the code resources of the HS-PDSCH are enough.

8. A system of allocating code resources for a high speed physical downlink shared channel, HS-PDSCH, comprising a radio network controller and a base station;

wherein the radio network controller is configured to allocate code resources of a system to corresponding channels, and inform the usage states of the code resources to the base station;

the base station is configured to record and update the usage states of the code resources at the base station according to the information sent from the radio network controller, mark the usage state of code in the code resources as occupied when the code having same spreading factors as channelization codes of the HS-PDSCH allocated, mark the usage of a code to which a subcode corresponds as occupied if the subcode of the code is allocated by the radio network controller and allocate code with idle state to the HS-PDSCH when the code resources of the HS-PDSCH are not enough.

9. The system according to claim 8, wherein the base station is further configured to search in a virtual code information table recording the usage states of code resources at the base station the state records of the codes one by one in a descending order of a code tree, allocate the idle codes, which are consecutive with the codes allocated to the HS-PDSCH by the radio network controller, to the HS-PDSCH for temporary use, and set the states of the idle codes as temporarily used in the virtual code information table.

10. The system according to claim 9, wherein the base station is further configured to set the states of the codes as idle while the HS-PDSCH releasing the codes with temporarily used state after finishing scheduling.

11. The system according to claim 8, wherein the base station is further configured to receive information from a radio network controller that a code has been used after the code is allocated, and set the state of the corresponding code as occupied in a virtual code information table recording the usage states of code resources at the base station; or, receive information from a radio network controller that an occupied code has been set free after the code is released, and set the corresponding code as idle in a virtual code information table recording the usage states of code resources at the base station.

* * * * *